Figures 1, 2:
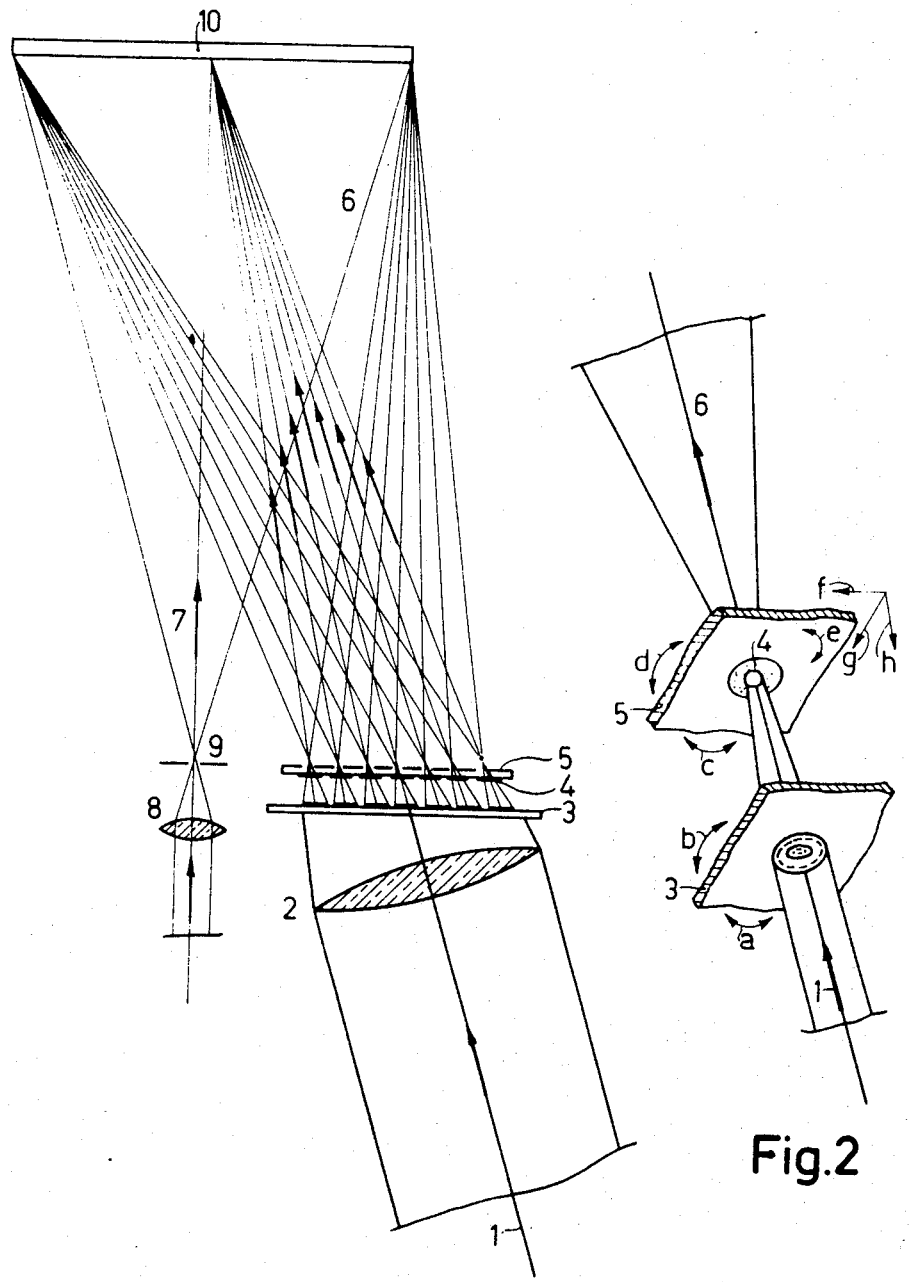

United States Patent
Klotz

[11] 3,752,555
[45] Aug. 14, 1973

[54] APPARATUS FOR MAKING MULTIPLE POINT HOLOGRAMS

[75] Inventor: Erhard Paul Artur Klotz, Hamburg, Germany

[73] Assignee: U.S. Philips Corporation, New York, N.Y.

[22] Filed: July 23, 1971

[21] Appl. No.: 165,570

[30] Foreign Application Priority Data
July 24, 1970   Germany................... P 20 36 904.4

[52] U.S. Cl. ...... 350/3.5, 350/162 SF, 350/162 ZP, 350/167
[51] Int. Cl. .......................................... G02b 27/00
[58] Field of Search ........... 350/3.5, 162 R, 162 SF, 350/162 ZP, 167; 96/36.2

[56] References Cited
UNITED STATES PATENTS
3,405,614   10/1968   Lin et al. .............................. 350/3.5
3,545,854   12/1970   Olsson........................... 350/162 ZP OTHER PUBLICATIONS
Sincerbox, "IBM Technical Disclosure Bulletin," Vol. 10, No. 3, Aug. 1967, pp. 267–8

Primary Examiner—David Schonberg
Assistant Examiner—Ronald J. Stern
Attorney—Frank R. Trifari

[57] ABSTRACT

A method and an apparatus for producing point holograms by means of an array of pinhole diaphragms is described. By illuminating the array of pinhole diaphragms through an array of zone plates disadvantages associated with known methods may be avoided.

2 Claims, 2 Drawing Figures

PATENTED AUG 14 1973

3,752,555

INVENTOR.
ERHARD PAUL ARTUR KLOTZ

BY
Frank R. Trifari
AGENT

APPARATUS FOR MAKING MULTIPLE POINT HOLOGRAMS

The invention relates to a method of making point holograms in which the radiation emanating from an array of pinhole-diaphragms is made to interfere with a reference radiation and the resulting interference pattern is recorded on a photosensitive material. The invention also relates to an apparatus for carrying out this method.

An important field of use of point holograms lies in the semiconductor technology in which, as is known, such holograms may be used for producing multiple images of masks used in the fabrication of integrated circuits. Other uses lie in the fields of optical data processing, optical data storage and the production of synthetic holograms.

TWO FUNDAMENTAL METHODS ARE KNOWN a. Recording a point hologram of a miniature lens array (fly's eye lens). However, these known lens arrays can not satisfy the requirements of the semiconductor technology, i.e., a high resolving power and the production of high-quality images. It would appear that these images may be improved by using an array of pinhole diaphragms which have diameters of about 1 $\mu$m and are arranged in the foci of this lens array. Manufacturing such a pinhole diaphragm array is hardly feasible owing to the large tolerances in the manufacture of the lens arrays. Manufacturing lens arrays having improved optical properties or smaller manufacturing tolerances is a very difficult and expensive process. At present lens arrays are available in a small number of dimensions only.

b. In another known recording technique the point hologram is made by stepwise displacement of a point light source and repeated exposure. The point light source comprises a microscope objective of short focal distance in the focus of which a pinhole diaphragm is located. The point light source is displaced by means of a slide rest. The spacing of the imaginary array of point light sources may be adjusted at will. In this recording technique only one point light source is required the manufacture of which presents no difficulty. In principle, however, this stepwise production of the hologram has the large disadvantage that the repeated exposure involves a poor hologram efficiency. Owing to the stepwise recording this method takes comparatively much time.

A further possibility of making point holograms has been proposed in the prior Pat. application, Ser. No. 100570, filed Dec. 22, 1970. In this method the simplicity of recording and the good imaging properties of the stepwise recording technique are utilized, the poor hologram efficiency being counteracted by a subsequent holographic copying process.

It is an object of the invention to provide an improved method of producing point holograms in which the disadvantages associated with the stepwise recording technique and the use of a lens array do not occur. The method according to the invention is characterized in that the array of pinhole diaphragms is exposed via an array of zone plates which is designed as a binary phase structure, the spacing of the array of zone plates being equal to that of the array of pin-hole diaphragms.

The elements required for this method, i.e., pin-holes having diameters of about 1 $\mu$m and zone plates which in view of the desired low light losses must have a sufficiently large aperture ratio, may be manufactured by using methods known in the semiconductor technology. These pinholes and zone plates may be imaged and multiplied by means of a step- and -repeat camera.

According to the invention, to improve the optical density and the efficiency the photomasks obtained by the above method are further processed in the following manner. The photomask of the pinhole diaphragm array is copied on a glass plate provided with a thin layer of metal by deposition from vapour, because the optical density of metal layers is better than that of photographic emulsions. For this purpose known photographic-chemical methods are utilised which are also used in the manufacture of integrated circuits. The zone plates, which initially are designed as amplitude structures, are unsuitable as illuminating elements because of their poor efficiency. Hence the array of zone plates is copied, for example, on a photoresist layer. The base for the photoresist is a glass substrate. The zone plates obtained in this manner as binary phase structures have an appreciably higher efficiency. The optimum modulation depth ($\lambda/2$) may previously be determined by the choice of the thickness of the resist layer.

The use of a step- and -repeat camera permits of choosing the spacing of the array of point light sources at will. The obtainable minimum spacing between the light sources is determined, however, by the geometric dimensions of the zone plates. Since, however, the zone plates may overlap one another, this spacing may be reduced.

Owing to the high reproducibility achievable by means of step- and -repeat camera the array of pinhole diaphragms and the array of zone plates may be made so as to have the same spacings, as is required for uniform illumination of the pinholes by means of the zone plates. At the same time this manufacturing method ensures a constant geometry of the pinholes and the zone plates.

An embdiment of the invention will now be described, by way of example, with reference to the accompanying diagrammatic drawings, in which:

FIG. 1 shows schematically an embodiment of an apparatus for carrying out the method according to the invention, and FIG. 2 illustrates the relative alignment of the pinhole diaphragms and the zone plates used in this embodiment.

In the apparatus shown in FIG. 1 a beam of radiation emanating from a source of radiation, for example a laser, not shown, illuminates an array of zone plates 3. This array produces a plurality of sub-beams, the individual zone plates focusing the sub-beams on the pinhole diaphragms. To achieve satisfactory illumination of the pinholes the zone plates and the pinhole diaphragms are to be relatively aligned in different manners. This is shown by the arrows $a$ to $h$ in FIG. 2.

The spherical waves 6 which emerge from the matrix of pinhole diaphragms 5 interfere with a reference wave 7 which has passed through an optical system 8 and a pinhole diaphragm 9. The resulting interference pattern is recorded in known manner as an amplitude hologram or a phase hologram.

According to the invention there is inserted in the path of the radiation beam 1, in front of the matrix of zone plates, an optical imaging system 2. This imaging system focuses incident radiation on the photographic plate 10. This ensures that that spherical waves which emerge from the array of pinhole diaphragms cooperate with one another in an optimum manner, so that the information is uniformly distributed over the photographic plate 10.

Periodic arrays have the disadvantage that at predetermined distances repeated self-imaging planes occur which cause a highly irregular intensity distribution in the hologram plane. As a result, in the photographic recording the linear range of the H and D curve may be exceeded. These inconvenient self-imaging planes may be suppressed in known manner by statistically modulating the phase of the wave front illuminating the periodic structure by means of a phase plate.

In the arrangement of zone plates and pinhole diaphragms used in the embodiment described, according to the invention the front surface of the array of pinhole diaphragms 5 may be designed as a phase plate 4 having a statistical distribution of the abrupt phase variations by the deposition of dielectric materials from vapour. The magnitude of the sudden phase variations is determined by the thickness of the layer and by the index of refraction of the material.

The phase plate 4 introduces statistical phase variations in the various radiation paths which prevent self-imaging as produced in periodic arrangements.

What is claimed is:

1. Apparatus for making multiple point holograms, comprising a source of coherent radiation, a plate of photosensitive material, optical means interposed in the path of the coherent radiation for focussing said radiation on the plate of photosensitive material, an array of pinhole diaphragms located between the optical means and the photosensitive material in the path of the radiation passing through the optical means, an array of zone plates having a binary phase structure located between the optical means and the array of pinhole diaphragms and arranged to focus the radiation eminating from the optical means on the array of pinhole diaphragms, the spacing of the array of zone plates being equal to that of the array of pinhole diaphragms, and phase plate means located on said array of pinhole diaphragms for randomly varying the phase of the radiation eminating from the zone plates and passing through the pinholes.

2. Apparatus as claimed in claim 1, wherein the phase plate means comprises a dielectric material vapour deposited on the array of pinhole diaphragms.

* * * * *